(12) United States Patent
Sorgi et al.

(10) Patent No.: US 6,493,359 B1
(45) Date of Patent: Dec. 10, 2002

(54) RECONFIGURABLE FRAME COUNTER

(75) Inventors: Alan M. Sorgi, San Diego, CA (US); Scott A. Applebaum, San Diego, CA (US)

(73) Assignee: Applied Micro Circuits Corporation, San Diego, CA (US)

(*) Notice: Subject to any disclaimer, the term of this patent is extended or adjusted under 35 U.S.C. 154(b) by 0 days.

(21) Appl. No.: 09/305,248

(22) Filed: May 4, 1999

(51) Int. Cl.[7] ............................... H04J 3/07; H04J 3/06
(52) U.S. Cl. .................. 370/506; 370/509; 370/539
(58) Field of Search ........................... 370/503, 505–6, 370/509, 514, 516, 537, 539, 540; 375/342

(56) References Cited

U.S. PATENT DOCUMENTS 5,857,092 A * 1/1999 Nakamura et al. ............ 395/500
5,938,309 A * 8/1999 Taylor ........................... 357/124

OTHER PUBLICATIONS

"Measurement: Introduction to SONET", Tektronics MDB: Technical Briefs>SONET Primer—Introduction, pp 1–3. wysiwyg://Content.63/http://www.tek.comMeasurement/APP_Notes/SONET/sonet.html.

"Measurement: Frame Format Structure", Tekronix MBD: Technical Briefs > SONET Primer. pp. 1–3, wysiwyg://Content.63/http://www.tek.com?Measurement/App_Notes/SONET/frame.html.

"Measurement: SONET Multiplexing", Tekronix MBD: Technical Briefs > SONET Primer. pp. 1–2, wysiwyg://Content.63/http://www.tek.com?Measurement/App_Notes/SONET/multiplexer.html.

* cited by examiner

*Primary Examiner*—Chau Nguyen
*Assistant Examiner*—Ron Abelson
(74) *Attorney, Agent, or Firm*—Gray Cary Ware & Freidenrich

(57) ABSTRACT

The invention provides an apparatus, and related method, for providing a reconfigurable frame counter that can accommodate differing start of frame pulse locations in a synchronous communication system. The frame counter may be integrated with existing devices thus providing a cost effective advance in the functionality of existing communication devices. The reconfigurable frame counter includes a multiplexer, a byte processor and a frame counter. The multiplexer byte interleave multiplexes a plurality of lower data rate SONET signals to generate a higher data rate SONET signal of framed data bytes. The byte processor processes transport overhead bytes of the higher data rate SONET signal in accordance with a frame byte count value. The frame byte counter counts clock pulses that are each associated with the arrival of a framed data byte and generates a frame byte count value that corresponds to a frame byte location of the currently received framed data byte. The frame byte counter has a programmable configuration start address value and a synchronization pulse input and, in response to a synchronization pulse on the synchronization pulse input, the frame byte counter counts the clock pulses with an initial start count equal to the configuration start address value such that the frame byte count value indicates the frame byte location of the currently received framed data byte.

18 Claims, 7 Drawing Sheets

| A1 (F6) | A1 (F6) | A1 (F6) | A1 (F6) | A1 (F6) | A1 (F6) | A1 (F6) | A1 (F6) | A1 (F6) | A1 (F6) | A1 (F6) | A1 (F6) | A2 (28) | A2 (28) | A2 (28) | A2 (28) | A2 (28) | A2 (28) |
|---|---|---|---|---|---|---|---|---|---|---|---|---|---|---|---|---|---|
| B1 (*) | (00) | (00) | (00) | (00) | (00) | (00) | (00) | (00) | (00) | (00) | (00) | E1 (00) | (00) | (00) | (00) | (00) | (00) |
| D1 (00) | (00) | (00) | (00) | (00) | (00) | (00) | (00) | (00) | (00) | (00) | (00) | D2 (00) | (00) | (00) | (00) | (00) | (00) |
| H1 (62) | H1 (93) | H1 (93) | H1 (93) | H1 (88) | H1 (90) | H1 (93) | H1 (93) | H1 (93) | H1 (93) | H1 (93) | H1 (93) | H2 (08) | H2 (FF) | H2 (FF) | H2 (FF) | H2 (FF) | H2 (FF) |
| B2 () | B2 () | B2 () | B2 () | B2 () | B2 () | B2 () | B2 () | B2 () | B2 () | B2 () | B2 () | K1 (00) | (00) | (00) | (00) | (00) | (00) |
| D4 (00) | (00) | (00) | (00) | (00) | (00) | (00) | (00) | (00) | (00) | (00) | (00) | D5 (00) | (00) | (00) | (00) | (00) | (00) |
| D7 (00) | (00) | (00) | (00) | (00) | (00) | (00) | (00) | (00) | (00) | (00) | (00) | D8 (00) | (00) | (00) | (00) | (00) | (00) |
| D10 (00) | (00) | (00) | (00) | (00) | (00) | (00) | (00) | (00) | (00) | (00) | (00) | D11 (00) | (00) | (00) | (00) | (00) | (00) |
| Z1 (00) | Z1 (00) | Z1 (00) | Z1 (00) | Z1 (00) | Z1 (00) | Z1 (00) | Z1 (00) | Z1 (00) | Z1 (00) | Z1 (00) | Z1 (00) | Z2 (*) | Z2 (00) | Z2 (*) | Z2 (00) | Z2 (00) | Z2 (00) |

| A2 (28) | A2 (28) | A2 (28) | A2 (28) | A2 (28) | A2 (28) | C1 (*) | C1 (02) | C1 (03) | C1 (04) | C1 (05) | C1 (06) | C1 (07) | C1 (08) | C1 (09) | C1 (0A) | C1 (0B) | C1 (0C) |
|---|---|---|---|---|---|---|---|---|---|---|---|---|---|---|---|---|---|
| (00) | (00) | (00) | (00) | (00) | (00) | F1 (00) | (00) | (00) | (00) | (00) | (00) | (00) | (00) | (00) | (00) | (00) | (00) |
| (00) | (00) | (00) | (00) | (00) | (00) | D3 (00) | (00) | (00) | (00) | (00) | (00) | (00) | (00) | (00) | (00) | (00) | (00) |
| H2 (FF) | H2 (FF) | H2 (FF) | H2 (FF) | H2 (FF) | H2 (FF) | H3 (00) | H3 (00) | H3 (00) | H3 (00) | H3 (00) | H3 (00) | H3 (00) | H3 (00) | H3 (00) | H3 (00) | H3 (00) | H3 (00) |
| (00) | (00) | (00) | (00) | (00) | (00) | K2 (00) | (00) | (00) | (00) | (00) | (00) | (00) | (00) | (00) | (00) | (00) | (00) |
| (00) | (00) | (00) | (00) | (00) | (00) | D6 (00) | (00) | (00) | (00) | (00) | (00) | (00) | (00) | (00) | (00) | (00) | (00) |
| (00) | (00) | (00) | (00) | (00) | (00) | D9 (00) | (00) | (00) | (00) | (00) | (00) | (00) | (00) | (00) | (00) | (00) | (00) |
| (00) | (00) | (00) | (00) | (00) | (00) | D12 (00) | (00) | (00) | (00) | (00) | (00) | (00) | (00) | (00) | (00) | (00) | (00) |
| Z2 (00) | Z2 (00) | Z2 (00) | Z2 (00) | Z2 (00) | Z2 (00) | E2 (00) | (00) | (00) | (00) | (00) | (00) | (00) | (00) | (00) | (00) | (00) | (00) |

\*: C1 value defaults to C1 but can be programmed to be the 16 or 64 byte section image message.

\*\*: B1, B2 values depend on payload contents.

\*\*\*: Z2 value depends on incoming line bit errors. When not configured for STS-1, the first Z2 byte has a default value of 00.

FIG. 2B

RECONFIGURABLE FRAME COUNTER

BACKGROUND OF THE INVENTION

The present invention relates to digital communications, and more particularly, to the indication of a start of frame pulse location within a frame of digital data in a synchronous system. The invention is advantageous for configuring a digital communication system to accommodate differing start of frame pulse locations.

Existing propriety digital communications systems are typically designed with a start of frame pulse location at a fixed byte location in the frame. Moreover, the start of frame pulse location may be different between communication systems requiring equipment manufacturers to provide system specific equipment designs.

Accordingly, there exists a definite need for a digital communication system that can accommodate differing start of frame pulse locations within framed synchronous digital data. The present invention satisfies these needs and provides further related advantages.

SUMMARY OF THE INVENTION

The present invention is embodied in an apparatus, and related method, for providing a reconfigurable frame counter that can accommodate differing start of frame pulse locations in a synchronous communication system. The frame counter may be integrated with existing devices thus providing a cost effective advance in the functionality of existing communication devices.

The reconfigurable frame counter includes a multiplexer, a byte processor and a frame counter. The multiplexer byte interleave multiplexes a plurality of, lower data rate SONET signals to generate a higher data rate SONET signal of framed data bytes. The byte processor processes transport overhead bytes of the higher data rate SONET signal in accordance with predetermined frame byte count values. The frame byte counter counts clock pulses that are each associated with the arrival of a framed data byte and generates a frame byte count value that corresponds to a frame byte location of the currently received framed data byte. The frame byte counter has a programmable configuration start address value and a synchronization pulse input and, in response to a synchronization pulse on the synchronization pulse input, the frame byte counter counts the clock pulses with an initial start count equal to the configuration start address value such that the frame byte count value indicates the frame byte location of the currently received framed data byte.

Further, the frame byte counter may include a configuration start value latch, a configuration start address input and a write strobe input. The configuration start value latch latches the configuration start address value on the configuration start address input in response to a write strobe pulse on the write strobe input for programming the initial start count.

The lower data rate SONET signals may be four OC-12 signals that are byte interleave multiplexed into an OC-48 signal. The byte processor processes the B1 bytes of the OC-48 signal. The configuration start address value may be associated with a third A2 byte or with a first payload data byte of the OC-48 signal such as byte location number 145 of the OC-48 signal.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 2B shows the byte location mapping of the transport overhead portion of bytes of an STS-12/STM-4(SONET OC-12) frame.

DETAILED DESCRIPTION OF THE PREFERRED EMBODIMENTS

The present invention provides apparatus, and related method, for providing a reconfigurable frame counter for indicating the start of frame of digital data communicated based on a synchronous standard. The reconfigurable frame counter allows a digital communication system to be configured to accommodate differing start of frame locations.

Figure 1:
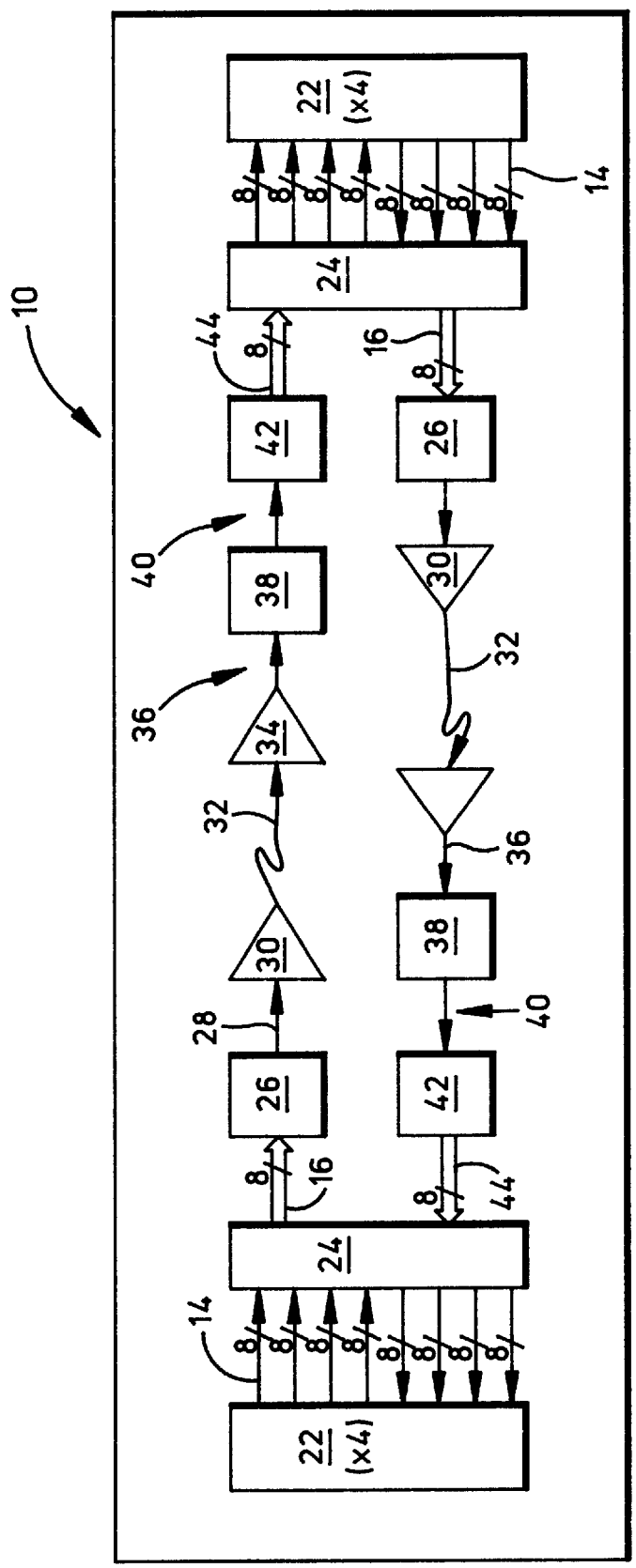
FIG. 1 is a block diagram of a digital communication system for multiplexing/demultiplexing four channels of framed synchronous data for serial transmission across an optical fiber.

A synchronous communication system 10 based on the Synchronous Optical Network (SONET) standard is shown in FIG. 1. SONET is a standard for connecting one optical fiber system to another at the optical level. SONET, together with the Synchronous Digital Hierarchy (SDH) administered by the ITU, forms a single international standard for optical fiber interconnects between telephone networks of different countries. SONET is capable of accommodating a variety of transmission rates and applications. The communication system receives four parallel serial-data-channels operating at a lower data rate and byte interleave multiplexes the data signals on the four channels into one higher data rate channel for transmission through an optical fiber. A return path is also included for two-way communications.

The data rates and signals designations of the SONET hierarchy is shown in Table 1 below:

TABLE 1

| SONET Signal Hierarchy | | | |
| --- | --- | --- | --- |
| Electrical | CCITT | Optical | Data Rate (Mbps) |
| STS-1 |  | OC-1 | 51.84 |
| STS-3 | STM-1 | OC-3 | 155.52 |
| STS-12 | STM-4 | OC-12 | 622.08 |
| STS-24 | STM-8 | OC-24 | 1244.16 |
| STS-48 | STM-16 | OC-48 | 2488.32 |
| STS-96 | STM-32 | OC-98 | 4976.64 |

Figure 2A:
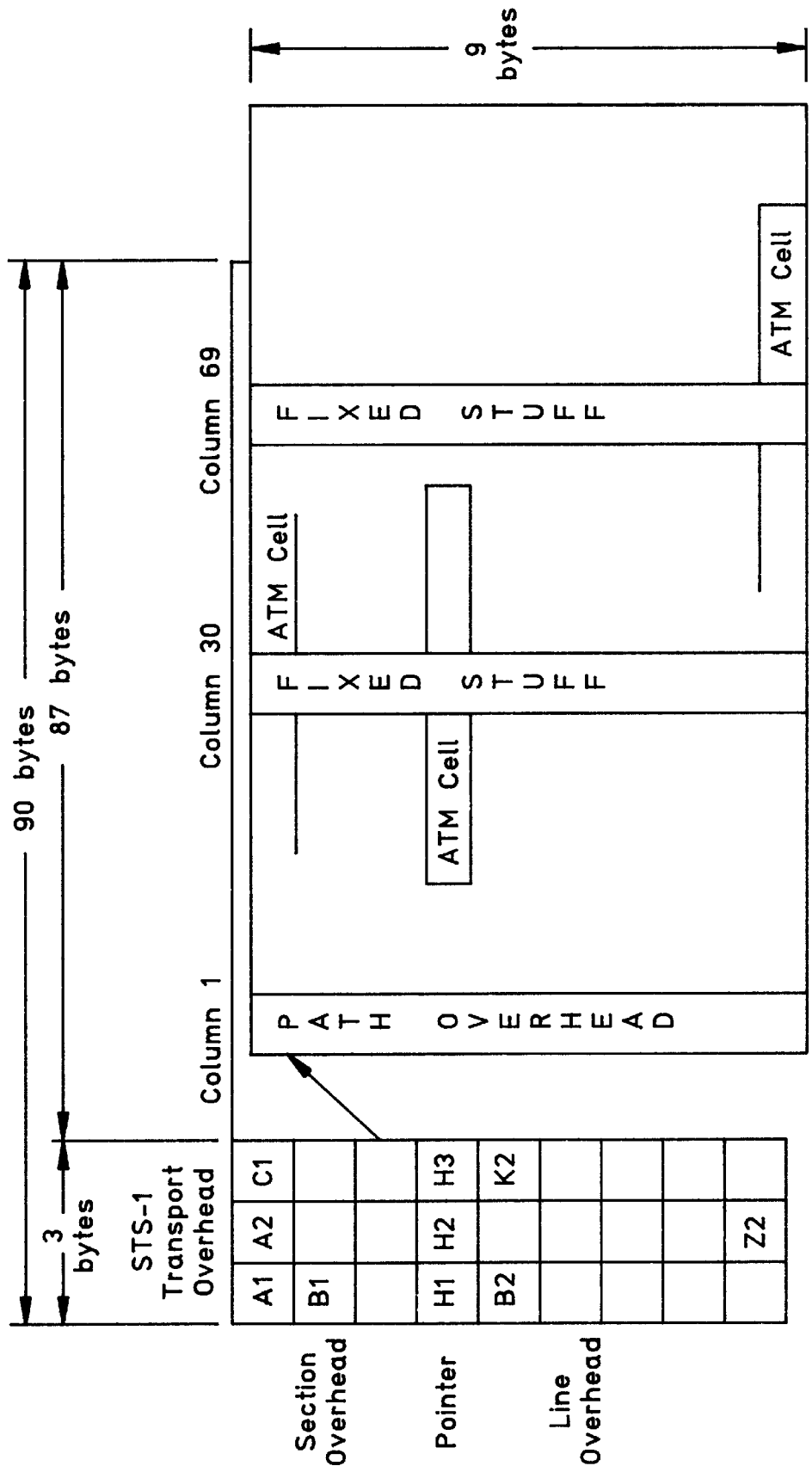
FIG. 2A shows the byte location mapping of an STS-1 frame having a transport overhead portion of bytes and a payload portion of bytes.

The fundamental SONET/SDH frame format is the Synchronous Transport Signal level-1 (STS-1) which is shown in FIG. 2A. The optical counterpart of the STS-1 signal is the optical carrier level-1 (OC-1) signal. As discussed in more detail below, an STS-N signal is formed of N byte-interleaved STS-1 signals. The STS-1 frame consists of 810 8-bit bytes mapped into 90 columns and 9 rows. The transmission interval between frames is 125 microseconds. The first 3 columns contain the transport overhead bytes and the remaining 87 columns contain the payload bytes.

The overhead bytes each have a specific designation and function defined in the SONET specification. The overhead bytes designated as the A1, A2 and B1 bytes will be specifically described to facilitate understanding the present invention. The A1 and A2 bytes are the first two bytes of the frame (row 1, columns 1 and 2, respectively) and indicate the beginning of the frame. The default value of the A1 byte is F6H and the default value of the A2 byte is 28H. The B1 byte contains a section bit interleaved parity code (SIP-8). The parity code uses even parity and indicates transmission errors over a transmission section. The BIP-8 byte is calculated over all bits of a previous STS-N frame after scrambling and then is placed in the B1 byte location of the current STS-1 frame before scrambling. This byte is only defined for the STS-1 number 1 of an STS-N signal.

The transport overhead byte portion of an STS-12 frame is shown in FIG. 2B. The frame interval remains 125 microseconds and the STS-1 bytes are interleaved into the corresponding locations in the STS-12 frames. Thus, the first twelve bytes of the frame are twelve A1 bytes.

The next twelve bytes are the A2 bytes. Accordingly, the first payload byte of the frame is byte location number 37. The B1 byte is in byte location number 1081.

Because the B1 byte is calculated for each frame, at locations of multiplexing and demultiplexing or the like, the B1 byte must be recalculated and inserted at the correct byte location. Accordingly, the start of frame (SOF) location must be detected so the corrected byte location can be determined.

Figure 3A:
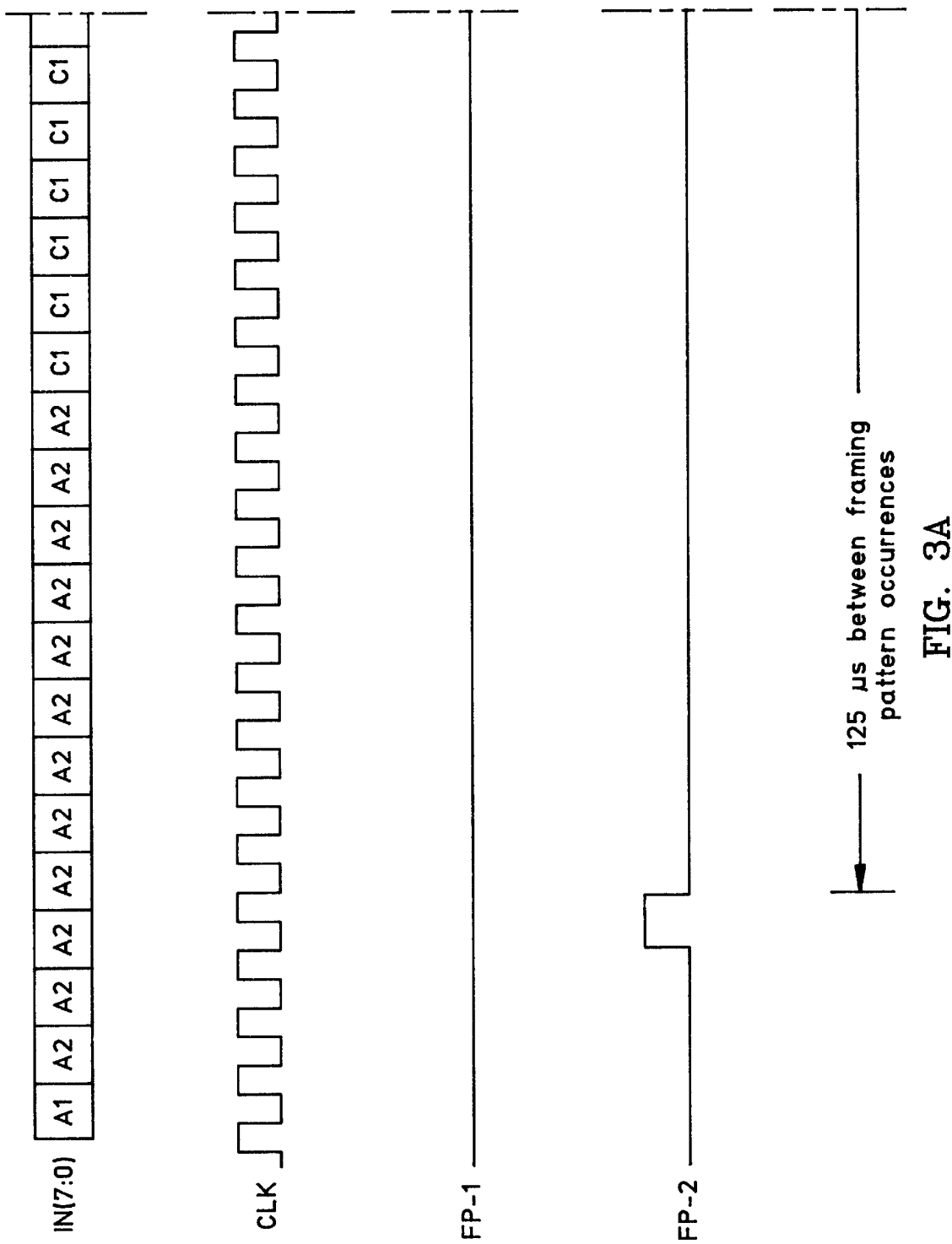
FIG. 3 is a timing diagram showing a frame synchronization pulse in relation with the byte locations of an STS-12 (SONET OC-12) frame.
Figure 3B:
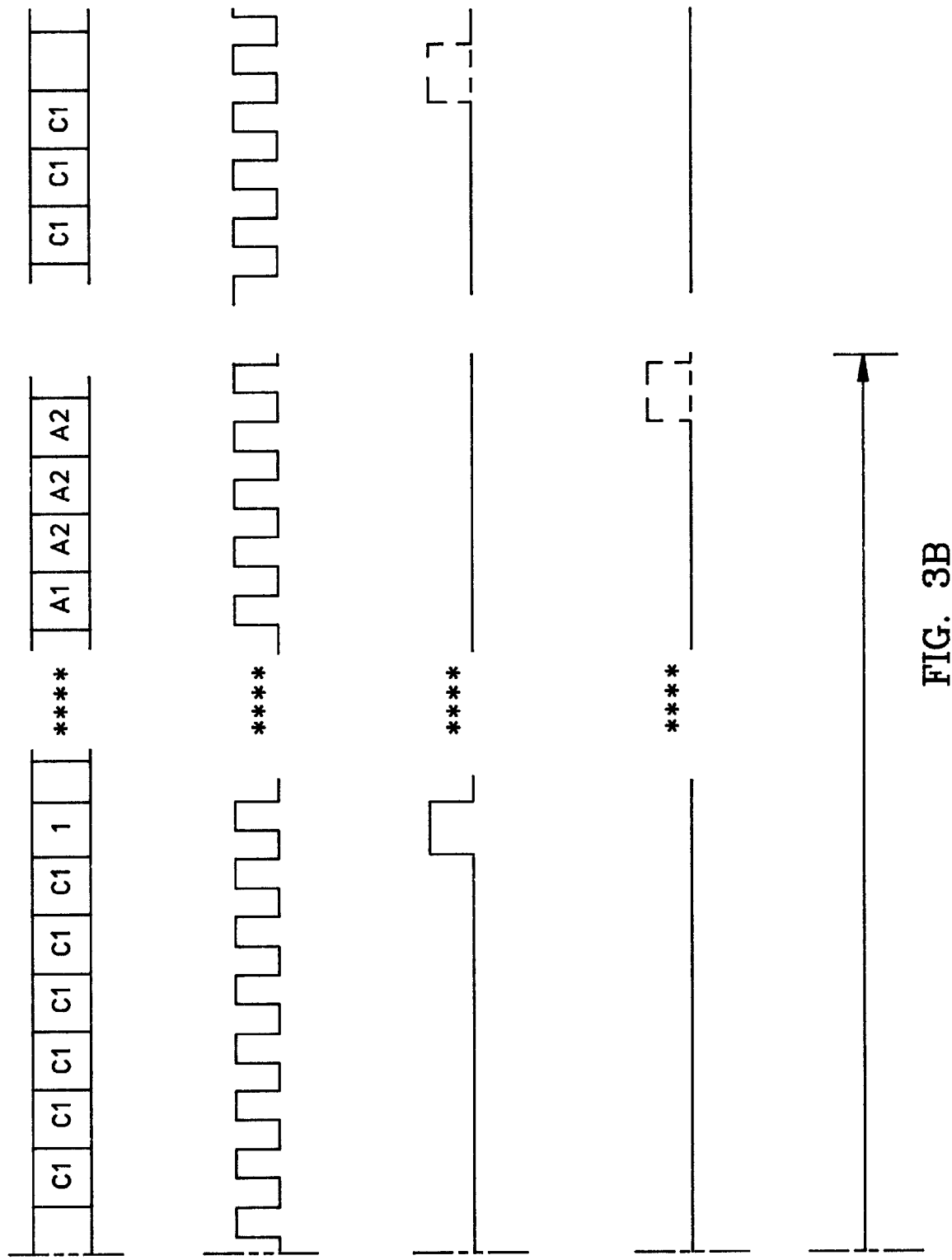

As shown in FIG. 3, the SOF is often indicated by a frame synchronization pulse FP-2 generated at the detection of the third A2 byte. Alternatively, the SOF ay be indicated by a frame synchronization pulse FP-1 generated at the time of the first payload byte. The SONET specification does not define the timing of the frame pulse and communications networks generally use any frame byte location within the first four STS-1 byte locations for timing the frame pulse.

Figure 2C:
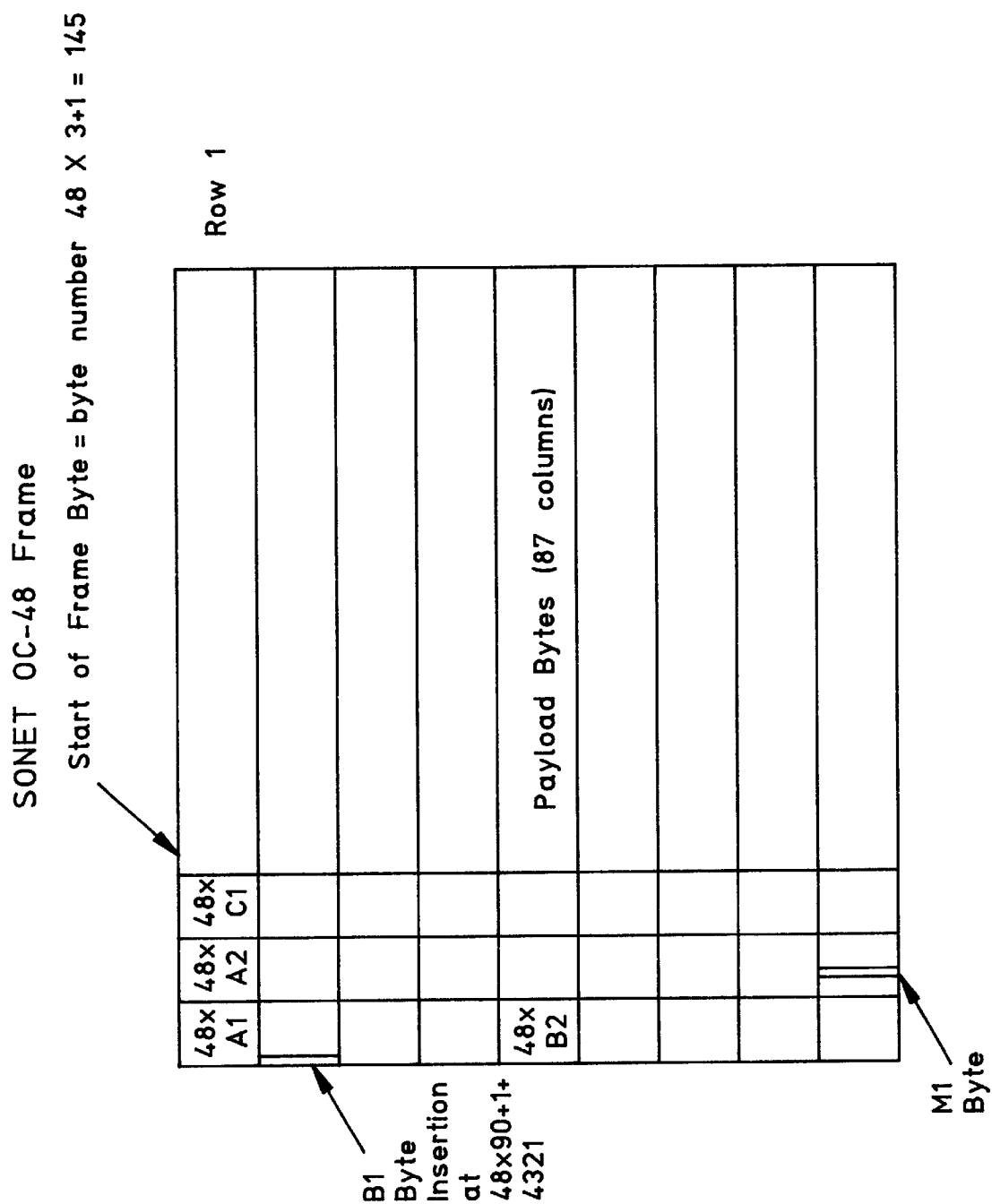
FIG. 2C shows the byte location mapping of an STS-48/STM-16 (SONET OC-48) frame.

An STS-48 frame is shown in FIG. 2C. The frame interval remains 125 microseconds and the STS-1 bytes are interleaved into the corresponding locations in the STS-48 frames. Thus, the first 48 bytes of the frame are the A1 bytes, the next 48 bytes are the A2 bytes, etc. The first payload byte is at byte location number 145 and often the frame pulse is generated to indicate this location. However, as mentioned above, any particular SONET network may have the frame pulse occurring at any location, typically occurring during the first four STS-1 byte locations.

The synchronous communication system shown in FIG. 1 provides bi-directional communications over two uni-directional optical fiber links. Each link takes four OC-12 signals 14 and multiplexes these signals into a single OC-48 signal 16. The OC-12 signals are each provided through a network interface or processor 22 such as part number PM5355 available from PMC-Sierra, Inc. of Burnaby, British Columbia, Canada. The four OC-12 signals are multiplexed into an OC-48 signal by a byte interleave device 24 such as part number S3045 available from Applied Micro Circuits Corporation (AMCC) of San Diego, Calif. The bytes are serialized by an 8:1 transmitter or serialization device 26, such as part number S3041 also available from AMCC, that generates a serialized OC-48 signal 28. The serial data signal is converted to optical light signals by an optical transmitter 30 and the light signals are coupled into an optical fiber 32. At the other end of the optical fiber is an optical receiver 34 that converts the light signals to serial electrical data signals 36. A clock recovery device 38 (e.g., AMCC part number S3040) recovers a timing signal from the serial data signal. The serial data signals 40 are converted to parallel data bytes by a deserialization interface device 42 (e.g., AMCC part number 3042) that also performs frame detection. The frame pulse and parallel data bytes are associated with an OC-48 data frame. The OC-48 parallel data bytes 44 are byte interleave demultiplexed to four OC-12 signals by the byte interleave device 24 (e.g., AMCC part number S3045). The four OC-12 signals are provided to the network interface 22.

Figure 4:
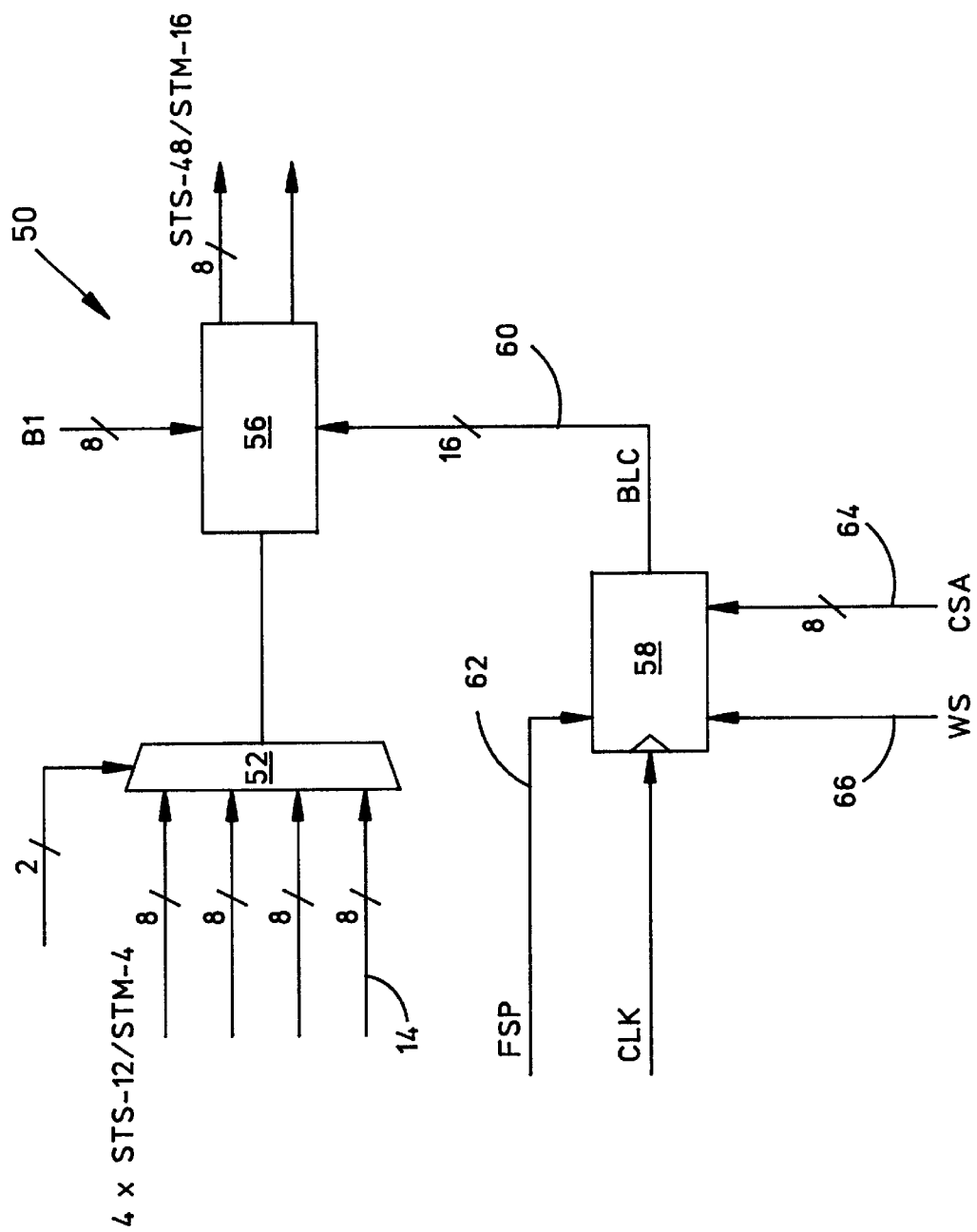
FIG. 4 is a block diagram of a portion of a SONET OC-12 to OC-48 multiplexer having a reconfigurable frame counter according to the present invention.

The reconfigurable frame counter 50 of the present invention is shown in FIG. 4. The counter is integrated with the byte interleave device 24 as a one chip device.

A transmitter of the byte interleave device receives the four OC-12 data signals and a multiplexer 52 byte interleave multiplexes the data signals to generate an OC-48 data signal 54. As mentioned above, certain bytes of the OC-48 data frame must be modified before transmission across the data link. A byte insertion/extraction processor 56 performs the insertions and/or extractions in the appropriate frame locations. A frame byte counter 58 provides the processor with an indication of the start of frame of the data frame on a byte location count (BLC) line 60. The frame counter may operate at either the OC-12 or OC-48 clock rate. The present discussion is based on the frame counter operating at the OC-48 frame rate.

The OC-48 data frame has 38,880 byte locations. The SOF pulse typically occurs during the first four STS-1 bytes or the first 145 OC-48 bytes. The transmitter provides a frame synchronization pulse FSP to the frame counter on an FSP line 62. The synchronization pulse generally occurs upon detection of the third A2 byte. This pulse, however, may represent a different byte location.

The reconfigurable frame counter 50 can accommodate any byte location for the synchronization pulse by use of a programmable configuration start address (CSA). The start address is the count associated with the synchronization pulse. An 8-bit word is placed on an address bus 64 and read into the frame byte counter 58 upon enablement of a write strobe WR line 66. The counter is started by the synchronization pulse FSP. The counter increments in response to a clock signal CLK operating at the OC-48 data rate. Thus, the frame byte count provided to the processor 56 on the BLC line 60 indicates current byte location in the OC-48 data frame.

Thus, the processor is able to extract, replace and insert overhead transport bytes, in accordance with the byte count from the frame byte counter. Because the frame byte counter may be loaded with any configuration start address, the timing of the SOF pulse can be configured by the system designer.

Accordingly, if the synchronization pulse is configured to occur with the third A2 byte, corresponding to frame byte location number 51, the configuration start address would be set to 51. Thus, when the counter receives the synchronization pulse, the frame counter will start counting from the initial start count value of 51. Further, if a designer configures the synchronization pulse to occur at a different frame byte location, for example, location number 70 corresponding to the twenty-second A2 byte, the configuration start address would be preloaded with the value of 70. Thus, when the frame counter is activated. by the synchronization pulse, the frame count corresponds the current frame byte location.

Thus, the reconfigurable frame counter 50 of the invention allows a synchronous digital communication system 10 to be configured to accommodate differing start of frame SOF or synchronization pulse locations. The frame counter may be integrated with existing devices providing a cost effective advance in the functionality of existing digital communication devices.

While the foregoing has been with reference to specific embodiments of the invention, it will be appreciated by those skilled in the art that these are illustrations only and that changes in these embodiments can be made without departing from the principles of the invention, the scope of which is defined by the appended claims.

We claim:

1. A reconfigurable frame counter, comprising:
    a byte processor that receives framed data bytes of synchronous digital data, wherein the framed data bytes are at predetermined frame byte locations and the processor processes data bytes in predetermined frame byte locations in accordance with predetermined frame byte count values; and
    a frame byte counter for counting clock pulses that are each associated with the arrival of a framed data byte and for generating a frame byte count value that corresponds to the frame byte location of the currently received framed data byte, the frame byte counter having a programmable configuration start address value and a synchronization pulse input, wherein the frame byte counter, in response to a synchronization pulse on the synchronization pulse input, counts the clock pulses with an initial start count equal to the configuration start address value such that the frame byte count value indicates the frame byte location of the currently received framed data byte.

2. A reconfigurable frame counter as defined in claim 1, wherein the frame byte counter further comprises a configuration start value latch, a configuration start address input and a write strobe input, wherein the configuration start value latch latches the configuration start address value on the configuration start address input in response to a write strobe pulse on the write strobe input for programming the initial start count.

3. A reconfigurable frame counter as defined in claim 1, further comprising a multiplexer that receives a plurality of framed synchronous data signals of a lower data rate and multiplexes the plurality of synchronous data signals into a framed synchronous data signal of a higher data rate to generate the framed data bytes of synchronous digital data received by the byte processor.

4. A reconfigurable frame counter as defined in claim 3, wherein the lower data rate data signals and the higher data rate data signals are framed in accordance with a SONET standard and the bytes processed by the byte processor are associated with byte interleave parity values for the framed data signals.

5. A reconfigurable frame counter as defined in claim 3, wherein the lower data rate framed synchronous data signals are four OC-12 signals that are byte interleave multiplexed into an OC-48 signal which is the higher data rate framed synchronous data signal and the byte processor processes the B1 bytes of the OC-48 signal.

6. A reconfigurable frame counter as defined in claim 5, wherein the configuration start address value is associated with a third A2 byte.

7. A reconfigurable frame counter as defined in claim 5, wherein the configuration start address value is associated with a first payload data byte of the OC-48 signal.

8. A reconfigurable frame counter as defined in claim 5, wherein the configuration start address value is associated with byte location number 145 of the OC-48 signal.

9. A synchronous communication system for multiplexing four OC-12 signals into a single OC-48 signal of framed data bytes for communication over an optical fiber link, comprising:
    a byte interleave device that byte interleave multiplexes the four OC-12 signals into the OC-48 signal;
    a byte processor that receives the OC-48 signal and replaces B1 data bytes of the OC-48 signal based on a predetermined frame byte count value;
    a frame byte counter for counting clock pulses that are each associated with the arrival of a framed data byte and for generating a frame byte count value that corresponds to a frame byte location of the currently received framed data byte, the frame byte counter having a programmable configuration start address value and a synchronization pulse input, wherein the frame byte counter, in response to a synchronization pulse on the cynchronization pulse input, counts the clock pulses with an initial start count equal to the configuration start address value such that the frame byte count value indicates the frame byte location of the currently received framed data byte.

10. A synchronous communication system as defined in claim 9, further comprising:
    a serialization device that generates a serialized OC-48 signal based on the OC-48 signal processed by the byte processor;
    an optical transmitter that generates an optical signal based on the serialized OC-48 data signal;
    an optical fiber that receives the optical signal and transmits the optical signal to an optical receiver that converts the optical signals to serial data signals;
    a deserialization interface device that converts the serial data signals to parallel data bytes and that performs frame detection; and
    a byte interleave demultiplex device that demultiplexes the parallel data bytes to generate four received OC-12 signals.

11. A synchronous communication system as defined in claim 9, wherein the frame byte counter further comprises a configuration start value latch, a configuration start address input and a write strobe input, wherein the configuration start value latch latches the configuration start address value on the configuration start address input in response to a write strobe pulse on the write strobe input for programming the initial start count.

12. A reconfigurable frame counter, comprising:
    a multiplexer that byte interleave multiplexes a plurality of lower data rate SONET signals to generate a higher data rate SONET signal of framed data bytes;
    a byte processor that processes transport overhead bytes of the higher data rate SONET signal in accordance with predetermined frame byte count values;
    a frame byte counter for counting clock pulses that are each associated with the arrival of a framed data byte and for generating a frame byte count value that corresponds to a frame byte location of the currently received framed data byte, the frame byte counter having a programmable configuration start address value and a synchronization pulse input, wherein the frame byte counter, in response to a synchronization pulse on the synchronization pulse input, counts the clock pulses with an initial start count equal to the configuration start address value such that the frame byte count value indicates the frame byte location of the currently received framed data byte.

13. A reconfigurable frame counter as defined in claim 12, wherein the frame byte counter further comprises a configuration start value latch, a configuration start address input and a write strobe input, wherein the configuration start value latch latches the configuration start address value on the configuration start address input in response to a write strobe pulse on the write strobe input for programming the initial start count.

14. A reconfigurable frame counter as defined in claim 12, wherein the lower data rate SONET signals are four OC-12 signals that are byte interleave multiplexed into an OC-48 signal which is the higher data rate SONET signal and the byte processor processes the B1 bytes of the OC-48 signal.

15. A reconfigurable frame counter as defined in claim 14, wherein the configuration start address value is associated with a third A2 byte.

16. A reconfigurable frame counter as defined in claim 14, wherein the configuration start address value is associated with a first payload data byte of the OC-48 signal.

17. A reconfigurable frame counter as defined in claim 14, wherein the configuration start address value is associated with byte location number 145 of the OC-48 signal.

18. Method for multiplexing four OC-12 signals into a single OC-48 signal of framed data bytes for synchronous communication over an optical fiber link, comprising:

byte interleave multiplexing the four OC-12 signals into the OC-48 signal;

replacing B1 data bytes of the OC-48 signal based on a predetermined frame byte count value;

counting clock pulses that are each associated with the arrival of a framed data byte and generating a frame byte count value that corresponds to a frame byte location of the currently received framed data byte in response to a synchronization pulse with an initial start count equal to the configuration start address value such that the frame byte count value indicates the frame byte location of the currently received framed data byte.

* * * * *